(12) United States Patent
Takano et al.

(10) Patent No.: US 8,786,790 B2
(45) Date of Patent: Jul. 22, 2014

(54) LIQUID CRYSTAL DISPLAY DEVICE

(75) Inventors: Keisuke Takano, Saitama-ken (JP); Takashi Sasabayashi, Saitama-ken (JP); Arihiro Takeda, Saitama-ken (JP); Keiji Tago, Saitama-ken (JP); Jin Hirosawa, Saitama-ken (JP); Hitomi Hasegawa, Saitama-ken (JP); Yusuke Morita, Saitama-ken (JP); Hirokazu Morimoto, Saitama-ken (JP)

(73) Assignee: Japan Display Inc., Tokyo (JP)

( * ) Notice: Subject to any disclaimer, the term of this patent is extended or adjusted under 35 U.S.C. 154(b) by 138 days.

(21) Appl. No.: 13/425,779

(22) Filed: Mar. 21, 2012

(65) Prior Publication Data
US 2012/0249930 A1 Oct. 4, 2012

(30) Foreign Application Priority Data
Mar. 29, 2011 (JP) ................................ 2011-073194

(51) Int. Cl.
*G02F 1/1335* (2006.01)

(52) U.S. Cl.
USPC .............................................. 349/15; 349/95

(58) Field of Classification Search
None
See application file for complete search history.

(56) References Cited

U.S. PATENT DOCUMENTS

| | | | |
|---|---|---|---|
| 5,956,001 A * | 9/1999 | Sumida et al. .................. 345/55 |
| 6,118,584 A | 9/2000 | Van Berkel et al. | |
| 6,266,116 B1 | 7/2001 | Ohta et al. | |
| 2001/0010575 A1 | 8/2001 | Yoshida et al. | |
| 2004/0165136 A1 | 8/2004 | Sugiyama et al. | |
| 2005/0003108 A1 * | 1/2005 | Sumida et al. .................. 428/1.1 |
| 2005/0206824 A1 | 9/2005 | Son et al. | |
| 2005/0219453 A1 | 10/2005 | Kubo et al. | |
| 2007/0115234 A1 | 5/2007 | Kim et al. | |
| 2008/0062358 A1 | 3/2008 | Lee et al. | |
| 2008/0080048 A1 | 4/2008 | Saishu et al. | |
| 2008/0180590 A1 | 7/2008 | Lee et al. | |
| 2008/0180623 A1 | 7/2008 | Lee et al. | |
| 2008/0186439 A1 | 8/2008 | Kwon et al. | |

(Continued)

FOREIGN PATENT DOCUMENTS

| | | |
|---|---|---|
| JP | 6-222397 | 8/1994 |
| JP | 7-159807 | 6/1995 |

(Continued)

OTHER PUBLICATIONS

U.S. Appl. No. 13/414,079, filed Mar. 7, 2012, Tago, et al.

(Continued)

*Primary Examiner* — Thanh-Nhan P Nguyen
(74) *Attorney, Agent, or Firm* — Oblon, Spivak, McClelland, Maier & Neustadt, L.L.P.

(57) ABSTRACT

In one embodiment, a liquid crystal display device includes a lens array unit having a cylindrical lens array constituted by a plurality of cylindrical lenses each having a lens surface and a generatrix corresponding to the lens surface. The lens surface is arranged in a line in a direction orthogonally crossing the generatrix. A first substrate is arranged at a back side of the lens array unit and includes a pixel electrode in a belt shape extending in a different direction from the direction in which the generatrix extends. The pixel electrode is formed in a V character shape. A second substrate is arranged between the lens array unit and the first substrate including a counter electrode in a belt shape commonly arranged on the pixel electrodes extending in a parallel direction to the pixel electrode.

16 Claims, 8 Drawing Sheets

(56) References Cited

U.S. PATENT DOCUMENTS

| | | |
|---|---|---|
| 2008/0186572 A1 | 8/2008 | Tomikawa et al. |
| 2009/0207363 A1 | 8/2009 | Hirosawa |
| 2010/0014039 A1* | 1/2010 | Kim et al. .................... 349/139 |

FOREIGN PATENT DOCUMENTS

| | | |
|---|---|---|
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 2005-3802 | 1/2005 |
| JP | 3644653 | 2/2005 |
| JP | 2005-242307 | 9/2005 |

OTHER PUBLICATIONS

U.S. Appl. No. 13,339,915, filed Dec. 29, 2011, Takano, et al.
U.S. Appl. No. 13/469,458, filed May 11, 2012, Takeda, et al.
U.S. Appl. No. 13/470,578, filed May 14, 2012, Takeda, et al.
U.S. Appl. No. 13/546,655, filed Jul. 11, 2012, Takano, et al.
U.S. Appl. No. 13/542,049, filed Jul. 5, 2012, Takeda, et al.
U.S. Appl. No. 13/562,647, filed Jul. 31, 2012, Takeda, et al.

* cited by examiner

LIQUID CRYSTAL DISPLAY DEVICE

CROSS-REFERENCE TO RELATED APPLICATION

This application is based upon and claims the benefit of priority from prior Japanese Patent Application No. 2011-073194, filed Mar. 29, 2011, the entire contents of which are incorporated herein by reference.

FIELD

Embodiments described herein relate generally to a liquid crystal display device.

BACKGROUND

Recently, flat display devices have been actively developed. Among others, liquid crystal display devices have attracted an attention due to their advantages such as lightness, thinness, and low power consumption. In particular, noteworthy constituents for an active matrix type liquid crystal display device incorporating a switching element in each pixel are those using a lateral electric field (including a fringe electric field) such as an IPS (In-Plane Switching) mode and FFS (Fringe Field Switching) mode. The liquid crystal display device in the lateral electric field mode includes pixel electrodes and counter electrodes formed in an array substrate, and performs switching of liquid crystal molecules using the lateral electric filed substantially parallel with a principal surface of the array substrate.

Furthermore, other techniques to switch liquid crystal molecules are also proposed using the lateral electric field or oblique electric field formed between the pixel electrode formed on the array substrate and the counter electrode formed on a counter substrate.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

Figure 1:
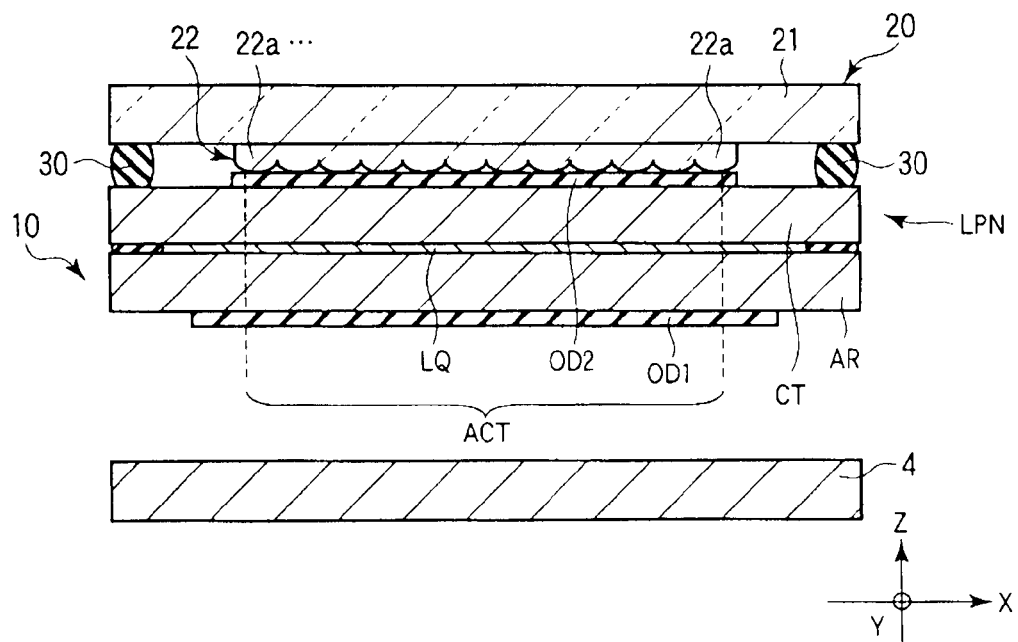
FIG. 1 is a cross-sectional view schematically showing the structure of a liquid crystal display device which can display a three-dimensional image.

A liquid crystal display device according to an exemplary embodiment of the present invention will now be described with reference to the accompanying drawings wherein the same or like reference numerals designate the same or corresponding parts throughout the several views.

According to one embodiment, a liquid crystal display device having a plurality of pixels includes: a lens array unit including a cylindrical lens array constituted by a plurality of cylindrical lenses each having a lens surface and a generatrix corresponding to the lens surface, the lens surface being arranged in a line in a direction orthogonally crossing the generatrix; a first substrate arranged at a back side of the lens array unit and including a pixel electrode in a belt shape extending in a different direction from the direction in which the generatrix extends, the pixel electrode being formed in a V character shape in each pixel; a second substrate arranged between the lens array unit and the first substrate including a counter electrode in a belt shape commonly arranged on the pixel electrode extending in a parallel direction to the pixel electrode; and a liquid crystal layer held between the first substrate and the second substrate.

FIG. 1 is a cross-sectional view schematically showing the structure of the liquid crystal display device which can display a three-dimensional image.

The liquid crystal display device 1 is equipped with a display unit 10 and a lens array unit 20 which is a light controlling element. The display unit 10 includes an active-matrix type transmissive liquid crystal display panel LPN and a backlight 4 for illuminating the liquid crystal display panel LPN.

The lens array unit 20 and the liquid crystal display panel LPN are formed in a plane plate of a rectangular shape arranged in a first direction X and a second direction Y that intersects perpendicularly the first direction X. For example, the lens array unit 20 and the liquid crystal display panel LPN have a long end in parallel to the first direction X, and a short end in parallel to the second direction Y. The backlight 4, the liquid crystal display panel LPN, and the lens array unit 20 are arranged in this order along a third direction Z that intersects perpendicularly the first direction X and the second direction Y.

The liquid crystal display device panel LPN includes an array substrate AR which is a first substrate, a counter substrates CT which is a second substrate facing the array substrate AR, and a liquid crystal layer LQ held between the array substrate AR and the counter substrates CT. The array substrate AR is arranged on the back side of the lens array unit 20. The counter substrate CT is arranged between the lens array unit 20 and the array substrate AR. A first optical element OD1 having a polarizing plate is arranged on one external surface of the array substrate AR. A second optical element OD2 having the polarizing plate is arranged on one external surface of the counter substrate CT.

The liquid crystal display panel LPN is equipped with an active area ACT which displays images. The active area ACT is constituted by a plurality of pixels arranged in the shape of m×n matrix (here, m and n are positive integers). Detailed explanation will be made later.

The backlight 4 is arranged at the back side of the array substrate AR in the illustrated example. Various devices, such as a light emitting diode (LED) and a cold cathode pipe (CCFL) can be applied as a light source for the backlight 4, and the detailed explanation is omitted.

The lens array unit 20 is equipped with a support plate 21 and a cylindrical lens array 22 arranged on the support plate 21. The support plate 21 is a glass substrate, for example. The lens array unit 20 is arranged so that the cylindrical lens array 22 faces the liquid crystal display panel LPN. That is, the cylindrical lens array 22 is located between the liquid crystal display panel LPN and the support plate 21.

The cylindrical lens array 22 is constituted by a plurality of cylindrical lenses 22a located in one direction. Especially a plurality of cylindrical lenses 22a is located in one direction which intersects perpendicularly the generatrix (or ridge line) of each lens surface. In the example shown here, the arrangement direction of the cylindrical lens 22a is the first direction X, and the generatrix direction of each lens surface of the plurality of cylindrical lenses 22a extends in the second direction Y. That is, in the example shown here, the cylindrical lens array 22 is arranged so that the generatrix direction of the cylindrical lens 22a becomes in parallel to the direction of the short end of the liquid crystal display panel LPN.

Each cylindrical lens 22a of the cylindrical lens array 22 is in contact with the liquid crystal display device panel LPN (or the second optical element OD2), for example. The lens array unit 20 extends to the outside of the active area ACT of the liquid crystal display panel LPN.

The lens array unit 20 and the liquid crystal display device panel LPN are pasted up with adhesives 30 on the outside of the active area ACT. Here, the support plate 21 of the lens array unit 20 and the counter substrate CT (or insulating substrate which constitutes the counter substrate CT) of the liquid crystal display panel LPN is pasted up with the adhesives 30. Thermosetting resin, ultraviolet curing resin, etc., can be used for the adhesives 30.

Figure 2:
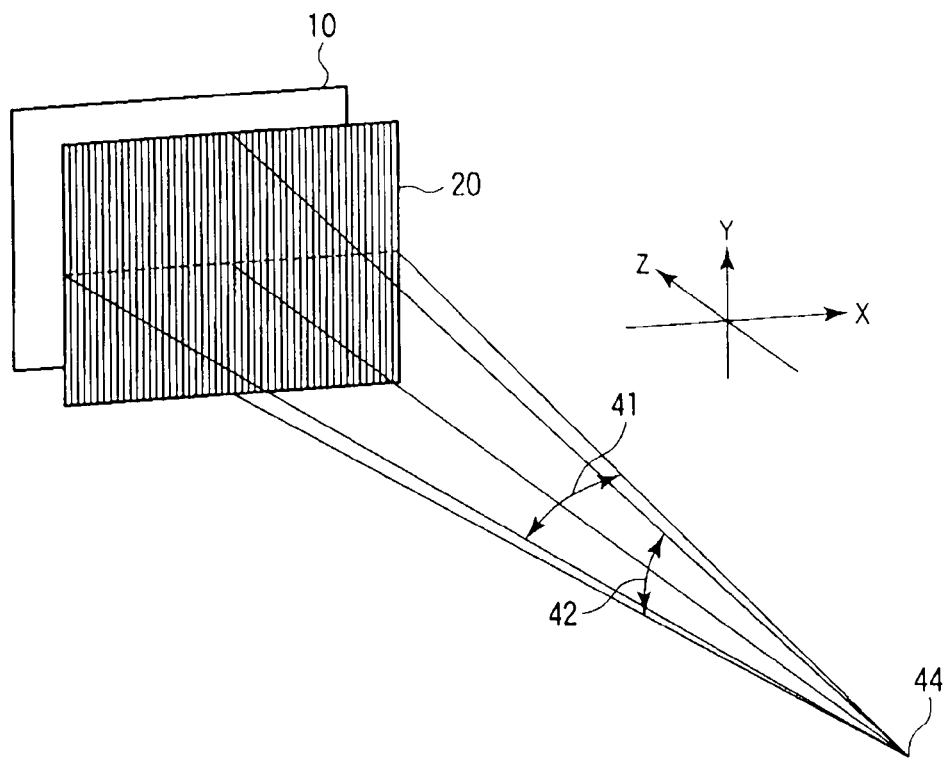
FIG. 2 is a perspective diagram schematically showing whole liquid crystal display device which can display the three-dimensional image.

FIG. 2 is a perspective diagram schematically showing the whole liquid crystal display device which can display the three-dimensional image.

The display unit 10 includes a high definition liquid crystal display panel LPN in which the pixels each having an element image display portion are arranged in the shape of a matrix. The lens array unit 20 which functions as a light controlling element is arranged so as to face the element image display portion, and displays the three-dimensional image with the light to various directions on the basis of each principal point of the cylindrical lens. In an observer's assumed position 44, observation of the three-dimensional image is attained near the front face and the back face of the lens array unit 20 in the range of the horizontal (here the first direction X) visual angle 41 and the perpendicular (here the second direction Y) visual angle 42.

Figure 3:
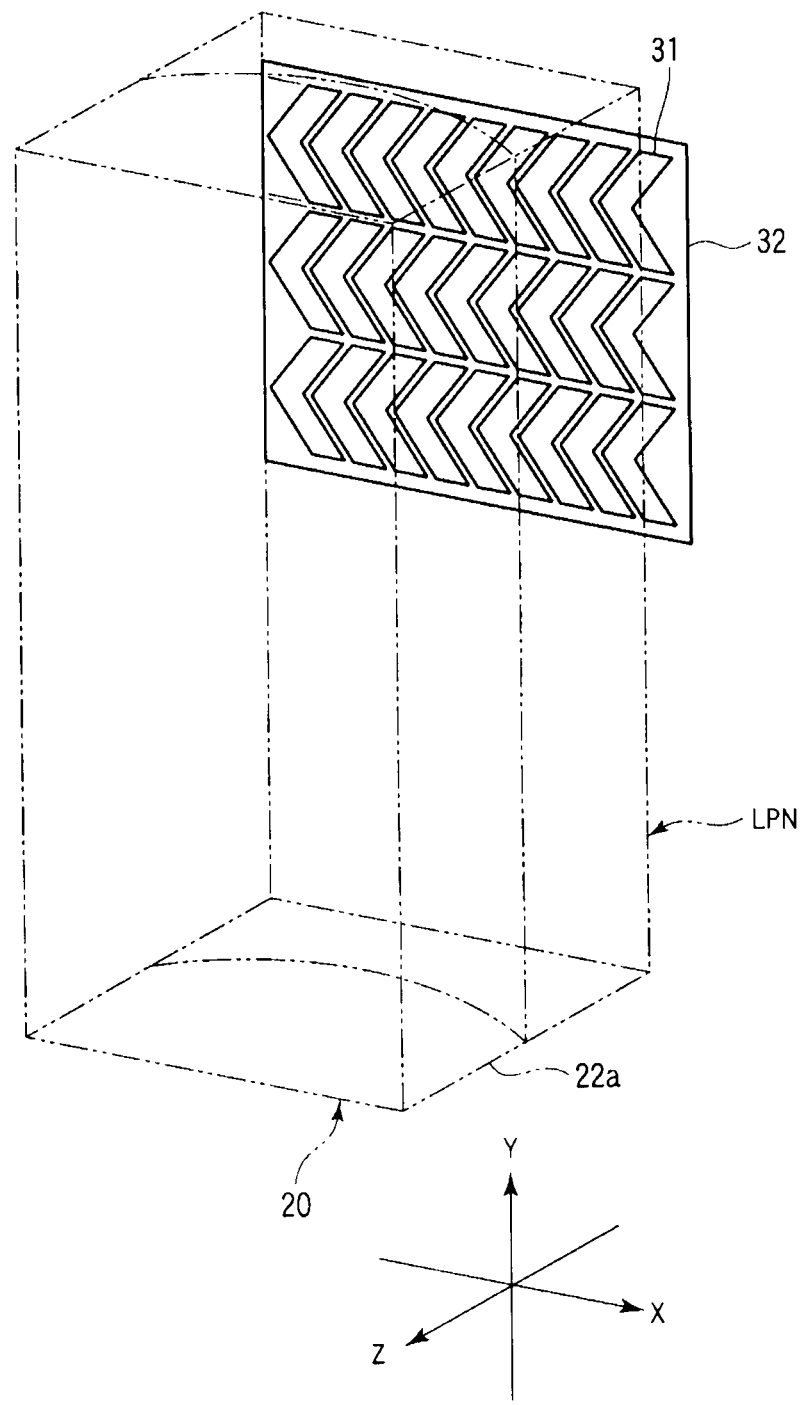
FIG. 3 is a perspective diagram schematically showing the structure of a portion of the liquid crystal display device which can display the three-dimensional image.

FIG. 3 is a perspective diagram schematically showing the structure of a portion of the liquid crystal display devices which can display the three-dimensional image.

Here, a case is shown, in which the lens array unit (lenticular sheet) 20 equipped with the cylindrical lens array having the cylindrical lens 22a is arranged in the front of the element image display portion of the liquid crystal display panel LPN. A plurality of sub-pixels 31 is arranged in the shape of a matrix in the element image display portion, respectively in the horizontal direction (the first direction X) and in the perpendicular direction (the second direction Y). Each sub-pixel 31 is formed in a crooked form in the shape of a V character shape, and may be called a crooked pixel or a V character shaped pixel.

In the example shown here, one effective pixel 32 at the time of three-dimensional image display is constituted by the sub pixels 31 of 9×3, for example. The effective pixel 32 contains 9 sub pixel 31 of the same color in the first direction X, and, more specifically, contains the sub pixels 31 of three colors of red (R), green (G), blue (B) in the second direction Y. At this time, the 9 sub pixels 31 of the same color may be located in a line with the same line, or may be arranged at one group of the three lines located in the second direction Y. When displaying the three-dimensional image, the display of multi-color images which gives 9 parallax differences is attained in the first direction with such structure.

Figure 4:
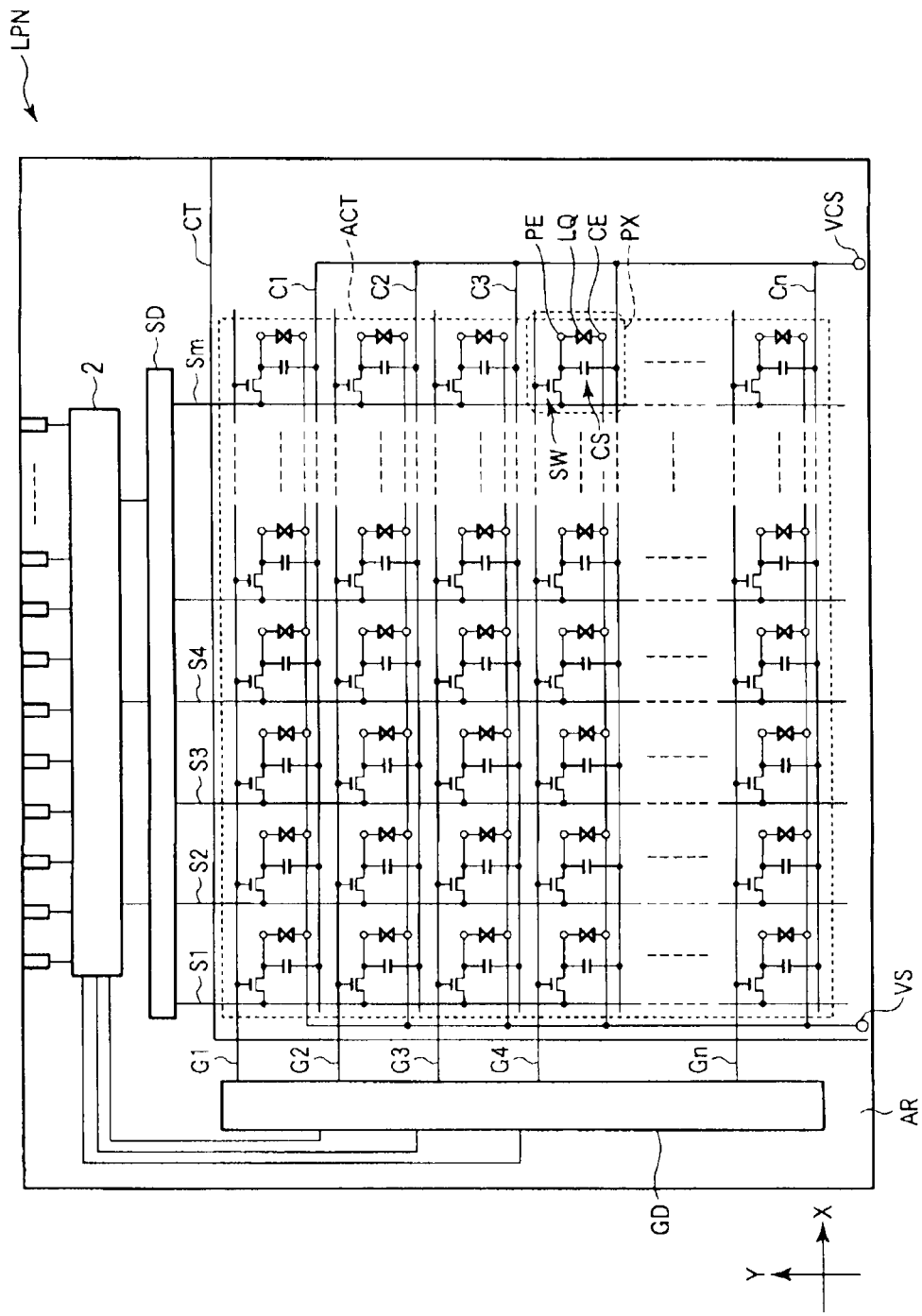
FIG. 4 is a figure schematically showing the structure and the equivalent circuit of the liquid crystal display panel of the liquid crystal device shown in FIG. 3.

FIG. 4 is a figure schematically showing a structure and an equivalent circuit of the liquid crystal display panel LPN shown in FIG. 3.

The liquid crystal display panel LPN is equipped with "n" gate lines G (G1-Gn), "n" auxiliary capacitance lines C (C1-Cn), "m" source lines S (S1-Sm), etc., in the active area ACT. Though the gate line G and the auxiliary capacitance line C respectively extend in a first direction X, they do not necessary extend linearly. Moreover, the gate line G and the auxiliary capacitance line C are arranged in parallel each other in the second direction Y that intersects perpendicularly the first direction X in turns. The source lines S extend in the second direction Y that intersects the gate line G and the auxiliary capacitance line C in parallel. That is, the gate line G and the auxiliary capacitance line C orthogonally cross the source lines S. Though the source lines S respectively extend along the second direction Y, they do not necessary extend linearly, and may bend by fitting to the shape of the pixel.

Each gate line G is pulled out to the outside of the active area ACT, and is connected to a gate driver GD. Each source line S is pulled out to the outside of the active area ACT, and is connected to a source driver SD. At least a portion of the gate driver GD and the source driver SD is formed in the array substrate AR, for example, and the gate driver GD and the source driver SD are connected with a driver IC chip 2 provided in the array substrate AR and having a controller.

Each pixel PX includes a switching element SW, a pixel electrode PE, a counter electrode CE, etc. Retention capacitance Cs is formed, for example, between the auxiliary capacitance line C and the pixel electrode PE.

In addition, in the liquid crystal display panel LPN according to this embodiment, while the pixel electrode PE is formed in the array substrate AR, the counter electrode CE is formed in the counter substrate CT. The liquid crystal molecule of a liquid crystal layer LQ is switched mainly using an electric field formed between the pixel electrodes PE and the counter electrodes CE. The electric field formed between the pixel electrode PE and the counter electrode CE is a lateral electric field substantially in parallel with the principal surface of the array substrate AR or the principal surface of the counter substrate CT, or an oblique electric field slightly oblique with respect to the principle surface of the substrates.

The switching element SW is constituted by n channel type thin film transistor (TFT), for example. The switching element SW is electrically connected with the gate line G and the source line S. The (m×n) switching elements SW are formed in the active area ACT.

The pixel electrode PE is electrically connected with the switching element SW. The (m×n) pixel electrodes PE are formed in the active area ACT. The counter electrode CE is set to a common potential, for example. The counter electrode CE is arranged in common to the plurality of pixel electrodes PE through the liquid crystal layer LQ. The counter electrode CE is electrically connected with an electric power supply portion VS formed in the array substrate AR through an electric conductive component which is not illustrated. The auxiliary capacitance line C is electrically connected with a voltage impressing portion VCS to which the auxiliary capacitance voltage is impressed.

Hereafter one basic structure according to this embodiment is explained. FIG. 3 is a plan view schematically showing a minimum unit constituent of one pixel PX.

The pixel electrode PE is formed in a V character shape or in a crooked shape. The pixel electrode PE extends in a belt shape along a direction different from the generatrix direction, i.e., the second direction Y. More specifically, the pixel electrode PE includes a first main electrode PA and a second main electrode PB. The first main electrode PA extends in the belt shape along with a first extending direction D1 different from the second direction Y. The second main electrode PB extends in the belt shape along with a second extending direction D2 different from the first extending direction D1. The first extending direction D1 and the second extending direction D2 are directions different from the direction for initial alignment of the liquid crystal molecule to be mentioned later. The first main electrode PA and the second main electrode PB are connected at respective ends.

The counter electrode CE is formed in the shape of a V character or in the crooked shape. The counter electrode CE is arranged above the pixel electrode PE while extending in the belt shape along a direction in parallel to the pixel electrode PE. More specifically, the counter electrode CE includes a third main electrode CA and a fourth main electrode CB. The third main electrode CA extends in the belt shape along with the first extending direction D1. The fourth main electrode CB extends in the belt shape along with the second extending direction D2. The third main electrode CA and fourth main electrode CB are connected at respective ends. The counter electrode CE and the above-mentioned pixel electrode PE are arranged by turns along the first direction X.

In addition, two third main electrodes CA as illustrated are located in a line along the first direction X. Hereinafter, in order to distinguish the two third main electrodes CA, the third main electrode of the left-hand side in the figure is called CA1, and the third main electrode of the right-hand side in the figure is called CA2. Similarly, two fourth main electrodes CB are also located in a line along the first direction X. Hereinafter, in order to distinguish the two fourth main electrodes CB, the fourth main electrode of the left-hand side in the figure is called CB1, and the fourth main electrode of the right-hand side in the figure is called CB2. The third main electrode CA1 and the fourth main electrode CB1 are connected, and the third main electrode CA2 and the fourth main electrode CB2 are connected, respectively. The third main electrodes CA1 and CA2 and the fourth main electrodes CB1 and CB2 are electrically connected altogether. That is, the counter electrode CE is formed in a comb-like shape.

A first main electrode PA is located between adjoining main electrodes CA1 and CA2. That is, the third main electrodes CA1 and CA2 are arranged on both sides of the first main electrode PA. For this reason, the third main electrode CA1, the first main electrode PA and third main electrode CA2 are arranged along the first direction X in this order. The first main electrode PA and the third main electrodes CA1 and CA2 are arranged in parallel each other. Moreover, the distance between the third main electrode CA1 and the first main electrode PA is almost the same as that between the third main electrode CA2 and the first main electrode PA.

A second main electrode PB is located between the adjoining fourth main electrodes CB1 and CB2. That is, the fourth main electrodes CB1 and CB2 are arranged on both sides of the second main electrode PB. For this reason, the fourth main electrode CB1, the second main electrode PB and the fourth main electrode CB2 are arranged along the first direction X in this order. The second main electrode PB and the fourth main electrodes CB1, and CB2 are arranged in parallel each other. Moreover, the distance between the fourth main electrode CB1 and the second main electrode PB is almost the same as that of the distance between the fourth main electrode CB2 and the second main electrode PB.

In the example shown here, the direction of initial alignment of the liquid crystal molecule LM is a direction in parallel to the first direction X, for example. The first extending direction D1 is a direction which crosses the initial alignment direction at an acute angle in a counterclockwise direction, and the second extending direction D2 is a direction which crosses the initial alignment direction at an acute angle in a clockwise direction. In addition, the direction for initial alignment of the liquid crystal molecule LM may be not only a direction in parallel to the first direction X but a direction in parallel to the second direction Y, for example.

Here, the angle $\theta 1$ between the direction of initial alignment (first direction X) and the direction of the first extending direction D1 and the angle $\theta 2$ between the direction of initial alignment (first direction X) and the direction of the second extending direction D2 is preferably set to an angle smaller than 45° and larger than 0°. Moreover, the angle $\theta 1$ may be the same as the angle $\theta 2$.

Figure 5:
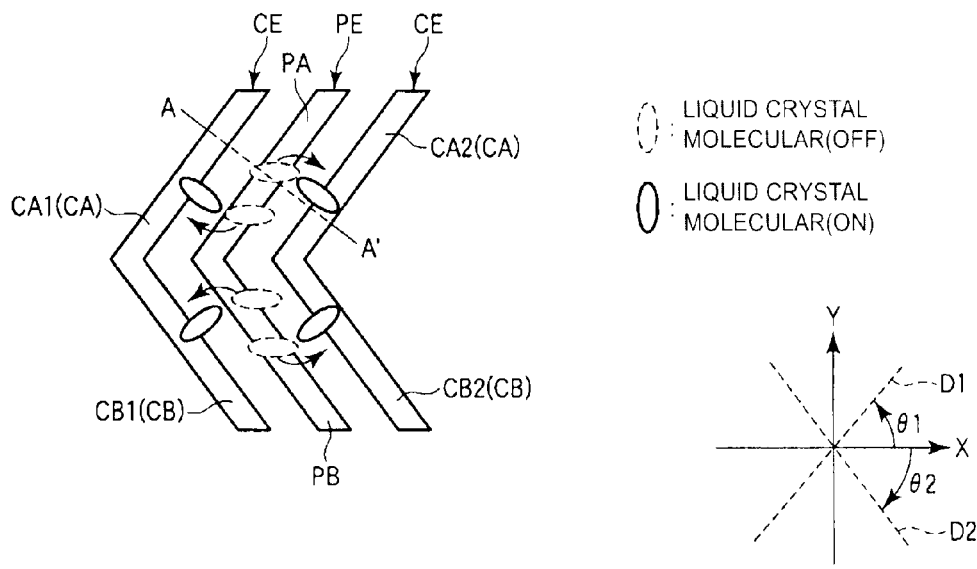
FIG. 5 is a plan view schematically showing the minimum unit constituent in one pixel.
Figure 6:
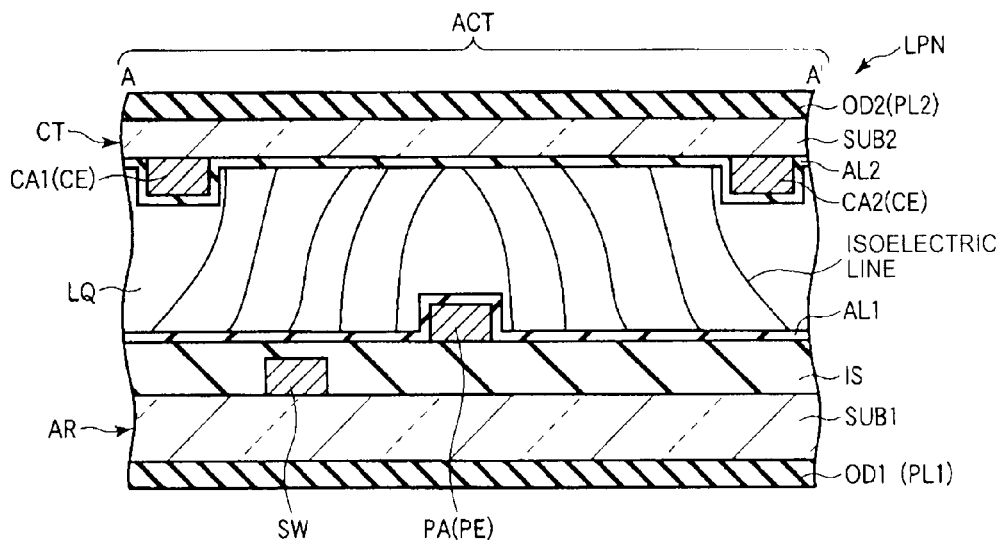
FIG. 6 is a cross-sectional view schematically showing a first main electrode, a third main electrode, and a liquid crystal display panel including a switching element among the minimum unit constituents shown in FIG. 5.

FIG. 6 is a cross-sectional view schematically showing the first main electrode PA, the third main electrodes CA1 and CA2, and the liquid crystal display panel LPN containing the switching element SW among the unit constituents shown in FIG. 5. Here, an isoelectric line is formed in the state where potential difference is formed between the first main electrode PA and the third main electrodes CA1 and CA2.

The array substrate AR is formed using a first insulating substrate SUB1 with light transmissivity, such as a glass substrate and a plastic substrate. The array substrate AR is equipped with the switching element SW, the pixel electrode PE, and a first alignment film AL1, etc., on the side which faces the counter substrate CT of the first insulating substrate SUB1.

The switching element SW may be a top gated type or a bottom gated type. Although not explained in detail, the switching element SW is equipped with a semiconductor layer formed of poly-silicon or amorphous silicon. The switching element SW is covered with an insulating layer IS in the illustrated example.

Although the insulating layer IS is not explained in detail, the insulating layer IS includes a plurality of insulating films. For example, the insulating layer IS includes a gate insulating film formed between the semiconductor layer and the gate line, and an interlayer insulating film which is arranged between the gate line and the source line, and may includes further the interlayer insulating film which is arranged between the source line and the pixel electrode PE. The various insulating films may be formed with inorganic compounds, such as nitride silicon and oxide silicon, and may be formed of various organic materials.

The pixel electrode PE includes the illustrated first main electrode PA and the non-illustrated second main electrode PB. The pixel electrode PE is formed of electric conductive and transmissive material, such as Indium Tin Oxide (ITO) and Indium Zinc Oxide (IZO). In the illustrated example, the pixel electrode PE is formed on the insulating layer IS, and is electrically connected with the switching element SW through a contact hole formed in the insulating layer IS.

The pixel electrode PE is formed in a different layer from the gate line and the source line, and insulating films are arranged among the lines. For this reason, while the pixel electrode PE is formed in the shape of an above V character or in the crooked shape, the form of the source line may be formed in the shape of the same V character or in the crooked shape as the pixel electrode PE, or may be formed in the shape of an approximately straight line along the second direction Y.

The first alignment film AL1 is arranged on the array substrate AR facing the counter substrate CT, and covers approximately whole active area ACT. The first alignment film AL1 covers the pixel electrode PE. The first alignment film AL1 is formed of the material which shows lateral alignment characteristics.

On the other hand, the counter substrate CT is formed using a second insulating substrate SUB2 with transmissivity, such as a glass substrate and a plastic substrate. The counter substrate CT is equipped with a counter electrode ET and a second alignment film AL2 on the side facing the array substrate AR of the second insulating substrate. In addition, the counter substrate CT may be equipped with a black matrix which divides the pixels into each pixel PX, a color filter layer arranged corresponding to each pixel, and an overcoat layer to smooth concave-convex of the surface of the color filter layer, etc., although the illustration is omitted.

The counter electrode CE includes third main electrodes CA1 and CA2 as illustrated, and fourth electrodes CB1 and CB2 that are not illustrated. The counter electrode CE is formed of electric conductive material with transmissivity, such as ITO and IZO. As illustrated, the third main electrodes CA1 and CA2 are arranged in positions shifted from right above the first main electrode PA. That is, each of the third main electrodes CA1 and CA2 is arranged on the both sides of the position right above the first main electrode PA, and are arranged so that they may not counter the first main electrode PA. Similarly, although not illustrated, each of the fourth main electrodes CB1 and CB2 is arranged on the both sides sandwiching a right above position of the second main electrode PB, and are arranged so that they may not counter the second main electrode PB.

In addition, a portion of the main electrodes which constitute the counter electrode CE may be arranged so that the portion may be formed in parallel to the source line in the crooked shape and may be located above the source line.

The second alignment film AL2 is arranged on the counter substrate CT facing the array substrate AR, and covers approximately whole of the active area ACT. The second alignment film AL2 covers the counter electrode CE. The second alignment film AL2 is formed of material which shows lateral alignment characteristics.

Alignment processing is performed to the first and the second alignment films AL1 and AL2 to align the liquid crystal molecules initially (rubbing treatment and light alignment treatment). The direction of the alignment film AL1 and the second alignment film AL2 are set in parallel with the directions of initial alignment, respectively, and also parallel with the first direction X in the illustrated example. In this example, the alignment directions of the first and second alignment films AL1 and AL2 are arranged in parallel and in reverse directions each other.

The array substrate AR and the counter substrate CT as described-above are arranged so that respective first and second alignment films AL1 and AL2 face each other. At this time, a pillar-shaped spacer formed integrally with one of the substrates is arranged by resin material between the first alignment film AL1 of the array substrate AR and the second alignment film AL2 of the counter substrate CT, and thereby, a predetermined gap, for example, 3-7 µm cell gap, is formed. The array substrate AR and the counter substrate CT are attached together by a seal material which is not illustrated, in which a predetermined cell gap is formed.

The liquid crystal layer LQ is held in the cell gap formed between the array substrate AR and the counter substrate CT, and is arranged between the first alignment film AL1 and the second alignment film AL2. Although the liquid crystal layer LQ is not illustrated, the liquid crystal layer LQ contains the liquid crystal molecule. The liquid crystal layer LQ is constituted of positive type liquid crystal material.

A first optical element OD1 having a first polarizing plate PL1 with a first polarization axis is attached on the external surface of the array substrate AR, i.e., the external surface of the first insulating substrate SUB1 which constitutes the array substrate AR by adhesives, etc. Moreover, a second optical element OD2 having polarizing plate PL2 with a second polarization axis is attached on the external surface of the counter substrate CT, i.e., the external surface of the second insulating substrate SUB2 which constitutes the counter substrate CT by adhesives, etc.

According to this embodiment, the first polarization axis of the first polarizing plate PL1 and the second polarization axis of the second polarizing plate PL2 are arranged so as to intersect perpendicularly each other. One polarizing plate is arranged so that the polarization axis is arranged in parallel or in orthogonal with the direction of long axis of the liquid crystal molecule. Thereby, a normally black mode is realized.

Namely, at the time when voltage is not impressed to the liquid crystal layer LQ, i.e., potential difference (or electric field) is not formed between the counter electrode CE and the pixel electrode PE (at the time OFF), the liquid crystal molecule LM of the liquid crystal layer LQ is aligned in each direction in which the alignment treatment for the first alignment film AL1 and the second alignment film AL2 are respectively performed. The direction of alignment of the liquid crystal molecule LM at the time of OFF corresponds to the direction of initial alignment. Here, each direction of alignment treatment of the first alignment film AL1 and the second alignment film AL2 is in parallel to the first direction X.

In addition, precisely, the liquid crystal molecules LM are not necessarily aligned in parallel with a X-Y plane, but are pretilted in many cases. For this reason, the precise direction of the initial alignment is a direction in which an orthogonal projection of the alignment direction of the liquid crystal molecule LM at the time of OFF is carried out to the X-Y plane. However, in order to explain simply hereinafter, the liquid crystal molecule LM is assumed that the liquid crystal molecule LM is aligned in parallel with a X-Y plane, and is explained as what rotates in a field in parallel to the X-Y plane.

For this reason, as shown in a dashed line in FIG. 5, the liquid crystal molecule LM is aligned so that that long axis may become in parallel with the first direction X. That is, the direction of the initial alignment of the liquid crystal molecule LM turns into the first direction X, which is an arrangement direction of the cylindrical lens (not shown). In addition, when both of the first alignment film AL1 and the second alignment film AL2 are aligned in parallel with the second alignment direction AL2, the liquid crystal molecule LM is initially aligned with the second direction Y that is a generatrix direction of the cylindrical lens (not shown) at the OFF time.

When the respective directions of the alignment treatment of the first alignment film AL1 and the second alignment film AL2 are reverse each other, the liquid crystal molecule LM is aligned so that the liquid crystal molecule LM is aligned with an approximately uniform pre-tilt angle near the first alignment film AL1, the second alignment film AL2 and the intermediate portion of the liquid crystal layer LQ in cross-section of the liquid crystal layer LQ (homogeneous alignment). In addition, when the respective directions of the alignment treatment of the first alignment film AL1 and the second alignment film AL2 are the same, the liquid crystal molecule LM is aligned with approximately horizontal direction (i.e., the pre tilt angle is approximately zero) in the cross-section of the liquid crystal layer LQ. The liquid crystal molecule LM is aligned with the pre-tilt angle so that the alignment of the liquid crystal molecule LM near the first alignment film AL1 and the second alignment film AL2 becomes symmetrical with respect to the intermediate portion (splay alignment).

Some of the backlight from the backlight 4 enters into the liquid crystal display panel LPN after penetrating the first polarizing plate PL1. The polarization state of the light which enters into the liquid crystal display panel LPN changes depending on the alignment state of the liquid crystal molecule when the light passes the liquid crystal layer LQ. At the time of OFF, the light which passes the liquid crystal layer LQ is absorbed by the second polarizing plate PL2 (black display).

On the other hand, in case where the potential difference is formed between the pixel electrode PE and the counter electrode CE (at the time of ON), the parallel lateral electric field to the substrate (or oblique electric field) is formed between the first main electrode PA and third main electrode CA1, and between the first main electrode PA and third main electrode CA2, respectively as shown in FIG. 6. Similarly, although not illustrated, the parallel lateral electric field to the substrate (or oblique electric field) is formed between the second main electrode PB and the fourth main electrode CB1, and between the second main electrode PB and the fourth main electrode CB2, respectively as shown in FIG. 6. Thereby, the liquid crystal molecule LM rotates within a parallel plane with the substrate surface so that the long axis becomes substantially in parallel with the direction of the electric field.

In the example shown in FIG. 5, the liquid crystal molecule LM between the first main electrode PA and the third main electrode CA1 rotates clockwise along with the lateral electric field between the first main electrode PA and the third main electrode CA1, and is aligned so that the liquid crystal molecule LM may turn to the upper left direction with respect to the first direction X in the figure. The liquid crystal molecule LM between the first main electrode PA and the third main electrode CA2 rotates clockwise along with the lateral electric field between the first main electrode PA and the third main electrode CA2, and is aligned so that the liquid crystal molecule LM may turn to the lower right direction with respect to the first direction X in the figure.

Moreover, the liquid crystal molecule LM between the second main electrode PB and the fourth main electrode CB1 rotates counterclockwise along with the lateral electric field between the second main electrode PB and the fourth main electrode CB1, and is aligned so that the liquid crystal molecule LM may turn to the lower left direction with respect to the first direction X in the figure. The liquid crystal molecule LM between the second main electrode PB and the fourth main electrode CB2 rotates counterclockwise along with the lateral electric field between the second main electrode PB and the fourth main electrode CB2, and is aligned so that the liquid crystal molecule LM may turn to the upper right direction with respect to the first direction X.

Thus, in each pixel PX, where horizontal electric field is formed between the pixel electrode PE and the counter electrode CE, the direction of the alignment of the liquid crystal molecule LM is divided into four directions, and respective domains are formed in each direction of the alignment. That is, four domains are formed in each pixel PX.

The polarization state changes when a part of the backlight which enters into the liquid crystal display panel LPN between the first main electrode PA and the third main electrode CA1, between the first main electrode PA and the third main electrode CA2, between the second main electrode PB and the fourth main electrode CB1, and between the second main electrode PB and the fourth main electrode CB2. At the time of ON state, the light which passes the liquid crystal layer LQ penetrates the second polarizing plate PL2 (white display).

That is, each of the regions between the first main electrode PA and the third main electrode CA1, between the first main electrode PA and the third main electrode CA2, between the second main electrode PB and the fourth main electrode CB1, and between the second main electrode PB and the fourth main electrode CB2 forms an aperture (or transmitting portion), respectively, which contributes to the display.

According to above structure, it becomes possible to form four domains. Therefore, the viewing angle in four directions can be compensated optically, and a wide viewing angle is attained while becoming possible to suppress the generation of gradation reversal. Accordingly, it becomes possible to offer a high quality display device.

According to this embodiment, since the lateral electric field or the oblique electric field formed between the array substrate AR and the counter substrate CT is used, even if the counter electrode CE is arranged closely adjacent to the pixel electrode PE, it becomes possible to prevent the generation of the short circuit therebetween. Accordingly, even if the size of one pixel is formed comparatively small, it becomes possible to arrange the counter electrode CE closely adjacent to the pixel electrode PE, and to achieve high definition display.

According to this embodiment, the angle θ1 between the first extending direction D1 of the first main electrode PA of the pixel electrode PE and the third main electrode CA of the counter electrode CE and the initial alignment direction of the liquid crystal molecule LM (for example, first direction X), and the angle θ2 between the second extending direction D2 of the second main electrode PB of the pixel electrode PE and the fourth main electrode CB of the counter electrode CE and the initial alignment direction of the liquid crystal molecule LM are preferably set to be larger than 0° and smaller than 45°, respectively.

When electric field is formed between the pixel electrode PE and the counter electrode CE, if the angle θ1 and the angle θ2 become not less than 45°, it becomes difficult to rotate the liquid crystal molecule LM in each domain uniformly in the above-mentioned direction, and becomes easy to produce alignment disorder. On the other hand, when the angle θ1 and the angle θ2 are acute angles smaller than 45° respectively, even if the intensity of electric field between the pixel electrode PE and the counter electrode CE is comparatively small, the liquid crystal molecule LM rotates uniformly in the above-mentioned direction in each domain, and it becomes possible to form four domains stably.

In addition, it is very effective to set the angle between the extending direction of the pixel electrode and the counter electrode and the initial alignment direction to approximately 5°-25°, and more preferably about 10° in the viewpoint of the control of the alignment of the liquid crystal molecule.

Moreover, when the angle θ1 is the same as the angle θ2, the alignment direction of the liquid crystal molecule LM between the first main electrode PA and the third main electrode CA becomes line symmetry with respect to the alignment direction of the liquid crystal molecule LM between the second main electrode PB and the fourth main electrode CB at the time of ON state.

Moreover, in one pixel in which the pixel electrode PE is arranged, the area of the aperture formed between the first main electrode PA and the third main electrode CA, is approximately the same as the area of the aperture formed between the second main electrode PB and the fourth main electrode CB, preferably. In this case, further, the area of the aperture formed between the first main electrode PA and third main electrode CA1 is approximately the same as the area of the aperture formed between the first main electrode PA and the third main electrode CA2. Further, it is more preferable for the area of the aperture formed between the second main electrode PB and the fourth main electrode CB1 to be the same as the area of the aperture formed between the second main electrode PB and the fourth main electrode CB2.

Thereby, the transmissivity of each domain becomes approximately same. For this reason, the light penetrating each aperture compensates each other optically, and it becomes possible to achieve the wide viewing angle range and to realize a uniform display.

In addition, the horizontal electric field is hardly formed (or sufficient electric field to drive the liquid crystal molecule LM is not formed) in the regions near the first main electrode PA and the second main electrode PB of the pixel electrode PE, and the third main electrode CA and the fourth main electrode CB of the counter electrode CE, at the time of ON state. Accordingly, the liquid crystal molecule LM hardly moves from the first direction X like the time of OFF state. For this reason, although the pixel electrode PE and the counter electrode CE are formed of the electric conductive material with transmissivity, the backlight hardly penetrates the electrodes in the domains, and they hardly contributes to the display at the time of ON state. Therefore, the pixel electrode PE and the counter electrode CE do not necessarily need to be formed of a transparent electric conductive material, and may be formed using electric conductive materials, such as aluminum and silver.

Moreover, when an alignment shift occurs between the array substrate AR and the counter substrate CT, a difference may arise in distance between the pixel electrode PE and the respective counter electrodes CE of the both sides. However, since the alignment shift is produced common to all the pixels PX, there is no difference in the electric field distribution between the pixels PX, and the display of the image is not affected.

Figure 7:
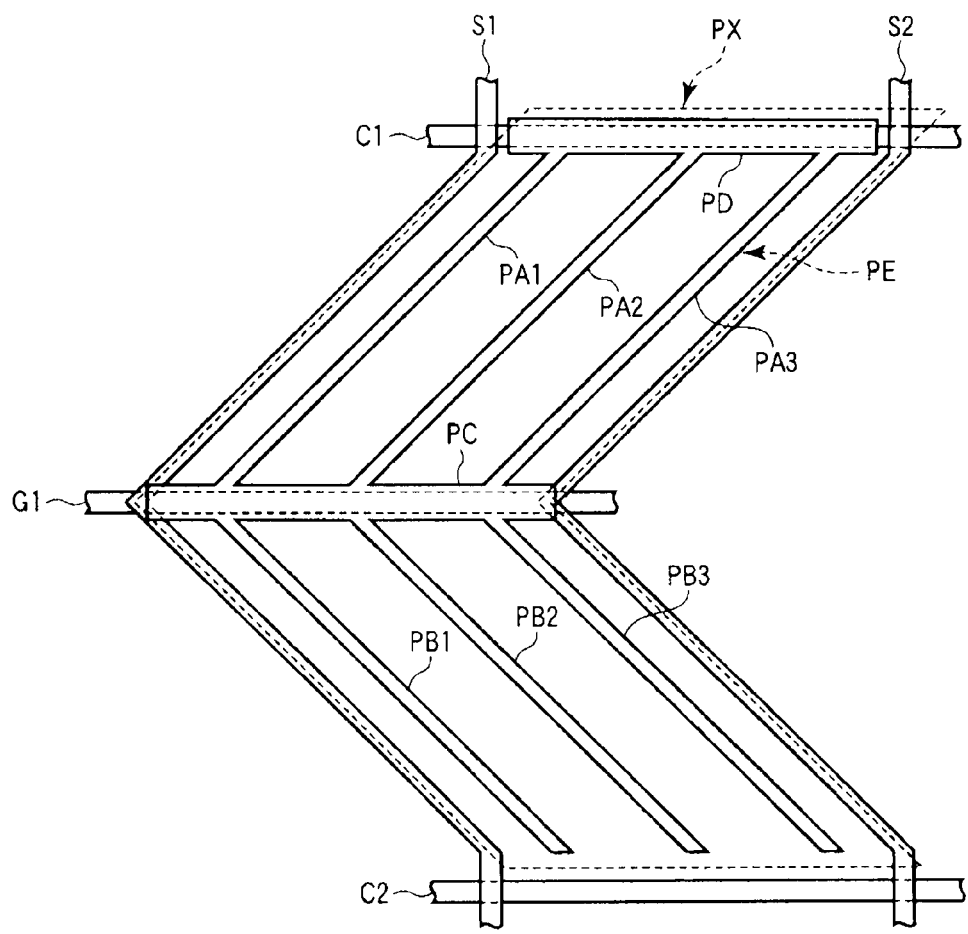
FIG. 7 is a plan view schematically showing the structure of an array substrate when the pixel of the liquid crystal display panel according to one embodiment is seen from the counter substrate side.
Figure 7:
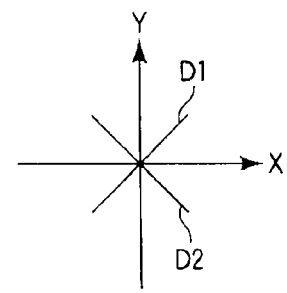

Next, one example of the structure according to this embodiment is explained. FIG. 7 is a plan view schematically showing the structure of the array substrate when the pixel PX of the liquid crystal display panel LPN is seen from the counter substrate CT side.

Here, the pixel PX is formed in a V character shape or in a crooked shape as shown by the dashed line in the figure. The gate line G1 and the auxiliary capacitance lines C1 and C2 extend along the first direction X, respectively. In the illustrated pixel PX, the auxiliary capacitance line C1 is arranged at the upper end, the auxiliary capacitance line C2 is arranged at the bottom end, and the gate line G1 is arranged approximately in the center between the auxiliary capacitance line C1 and the auxiliary capacitance line C2. The source lines S1 and S2 include crooked portions corresponding to the pixels PX in the shape of a V character or in the crooked shape in the example shown here. In the illustrated pixel PX, the source line S1 is arranged at the left-hand side end, and the source line S2 is arranged at the right-hand side end.

The pixel electrode PE is electrically connected with the switching element (not shown). The pixel electrode PE includes the first main electrodes PA1 to PA3, the second main electrodes PB1 to PB3, a first sub-electrode PC and a capacitance portion PD. The first main electrodes PA1 to PA3, the second main electrodes PB1 to PB3, the first sub-electrode PC and the capacitance portion PD are formed integrally and connected each other.

In addition, although only the pixel electrode PE arranged in one pixel PX is illustrated in the illustrated example, the pixel electrode of the same form is arranged about other pixels PX. Moreover, in this example, although the number of the first main electrodes and the number of the second main electrodes are three, respectively, the number is not restrict to this example.

The first main electrodes PA1 to PA3 are formed in the shape of a belt extending linearly along with the first extending direction D1, respectively. The first main electrodes PA1 to PA3 are arranged at the upper half portion of the pixel PX between the first sub-electrode PC and the capacitance portion PD (or auxiliary capacitance line C1) with a fixed distance therebetween and in parallel each other.

The second main electrodes PB1 to PB3 are formed in the shape of a belt extending linearly along with the second extending direction D2, respectively. The second main electrodes PB1 to PB3 are arranged at the lower half portion of the pixel PX between the first sub-electrode PC and auxiliary capacitance line C2 with a fixed distance therebetween and in parallel each other. The respective first main electrodes PA1 to PA3 are approximately line symmetry with the respective second main electrodes PB1 to PB3 with reference to the first sub-electrode PC arranged approximately in the center of the pixel.

The first sub-electrode PC extends in the belt shape so as to connect the first main electrode PA and the second main electrode PB extending in parallel to the gate line G1 in the illustrated example. The first sub-electrode PC is arranged approximately in the center of the pixel PX on the gate line G1 between the source line S1 and the source line S2. The length of the first sub-electrode PC along the first direction X is approximately same or more than that of the gate line G1 between the source line S1 and the source line S2. In addition, the width of the first sub-electrode PC along the second direction Y is approximately the same as or more than that of the gate line G1 in the second direction Y. For this reason, the gate line G1 is not exposed from the first sub-electrode PC between the source line S1 and the source line S2.

The capacitance portion PD extends in the belt shape in parallel to the auxiliary capacity line C1. In the illustrated example, the capacitance portion PD is formed in the shape of a belt extending linearly along the first direction X. The capacitance portion PD is arranged on the auxiliary capacitance line C1. In addition, the capacitance portion PD may be one portion of the pixel electrode PE, that is, formed integrally using the same material as the first main electrode PA as shown. However, the capacitance portion PD may be formed by other components electrically connected to the pixel electrode PE, for example, the same component as the semiconductor layer of the switching element or the source lines. The length of the capacitance portion PD in the first direction X is almost the same as or less than that of the auxiliary capacitance line C1 in the first direction X between the source line S1 and the source line S2.

Figure 8:
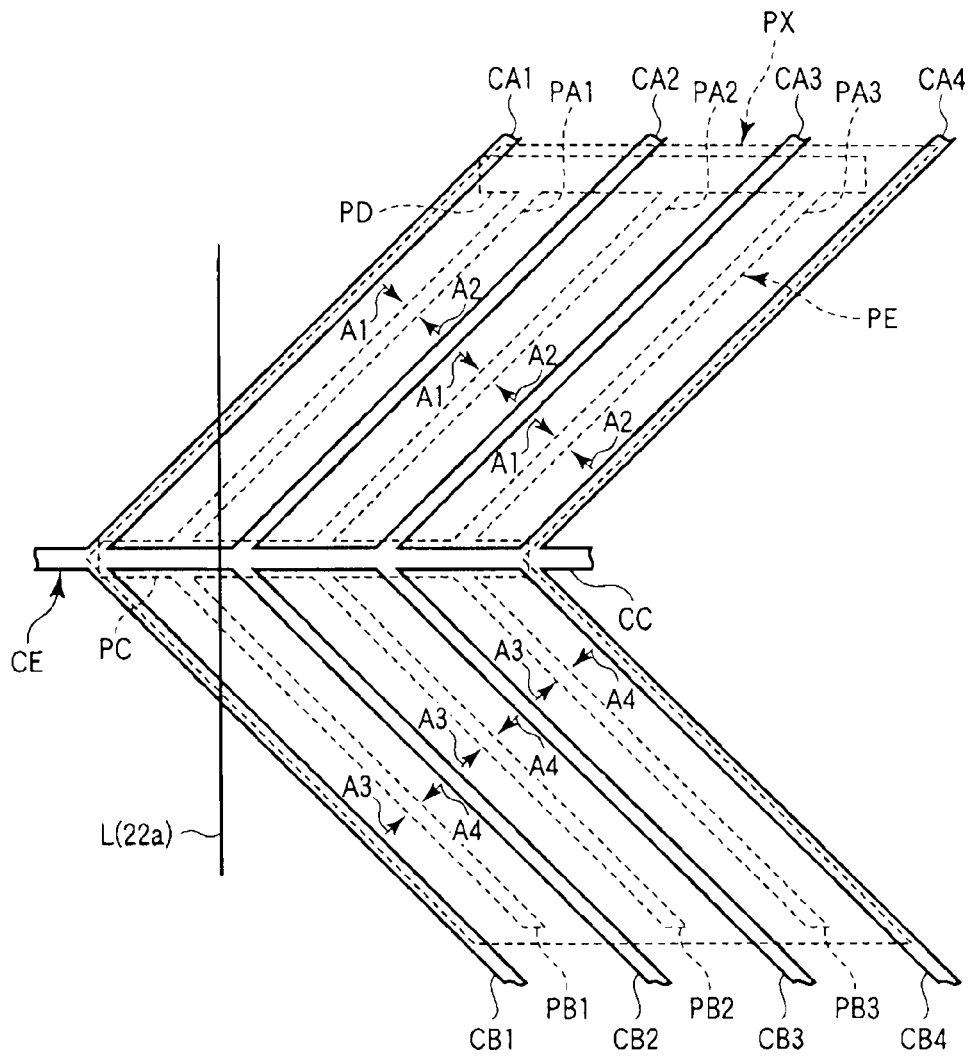
FIG. 8 is a plan view schematically showing the structure of the pixel in the counter substrate of the liquid crystal display panel according to this embodiment.

FIG. 8 is a plan view schematically showing the structure of the pixel PX in the counter substrate CT of the liquid crystal display panel LPN in the example according to this embodiment. In addition, in order to explain the positional relationship between the counter electrode CE and the pixel electrode PE, the pixel electrode PE is illustrated with the dashed line.

The counter electrode CE includes third main electrodes CA1 to CA4, fourth main electrode CB1 to CB4, and a second sub-electrode CC. The third main electrodes CA1 to CA4, the fourth main electrode CB1 to CB4, and the second sub-electrode CC are formed integrally and connected each other. In addition, in the illustrated example, although the number of the third main electrodes and the number of the fourth main electrodes are four, respectively, they can be suitably changed according to the form of the pixel electrode PE.

The third main electrodes CA1 to CA4 are formed in the shape of a belt extending linearly along with the first extending direction D1, respectively. The third main electrodes CA1 to CA4 are arranged at the upper half portion of the pixel PX with a fixed distance therebetween and in parallel each other. Moreover, the third main electrodes CA1 to CA4 are arranged in parallel to the first main electrodes PA1 to PA3.

The third main electrodes CA1 to CA4 does not overlap with the first main electrodes PA1 to PA3, and are arranged with a fixed distance therebetween in a line by turns. That is, the third main electrode CA1 is located in the left-hand side of the first main electrode PA1. The third main electrode CA2 is approximately located in the middle between the first main electrode PA1 first main electrode PA2. The third main electrode CA3 is approximately located in the middle between the first main electrode PA2 and first main electrode PA3. The third main electrode CA4 is located in the right-hand side of the first main electrode PA3. That is, in the upper half portion of the pixel PX, the third main electrode CA1, the first main electrode PA1, the third main electrode CA2, the first main electrode PA2, the third main electrode CA3, the first main electrode PA3, and the third main electrode CA4 are located in a line with this order toward right-hand side from left-hand side.

The fourth main electrodes CB1 to CB4 are formed in the shape of a belt extending linearly along with the second extending direction D2, respectively. The fourth main electrodes CB1 to CB4 are arranged at the lower half portion of the pixel PX with a fixed distance therebetween and in parallel each other. The fourth main electrodes CB1 to CB4 are arranged in parallel to the second main electrodes PB1 to PB3. The respective fourth main electrodes CB1 to CB4 are approximately line symmetry with the respective second main electrodes CA1 to CA4 with reference to the second sub-electrode CC arranged approximately in the center of the pixel.

The fourth main electrodes CB1 to CB4 do not overlap with the second main electrodes PB1 to PB3, and are arranged with a fixed distance therebetween in a line by turns. That is, the fourth main electrode CB1 is located in the left-hand side of the second main electrode PB1. The fourth main electrode CB2 is approximately located in the middle between the second main electrode PB1 and the second main electrode PB2. The fourth main electrode CB3 is approximately located in the middle between the second main electrode PB2 and the second main electrode PB3. The fourth main electrode CB4 is located in the right-hand side of the second main electrode PB3. That is, in the lower half portion of the pixel PX, the fourth main electrode CB1, the second main electrode PB1, the fourth main electrode CB2, the second main electrode PB2, the fourth main electrode CB3, the second main electrode PB3, and the fourth main electrode CB4 are located in a line with this order toward right-hand side from left-hand side.

The second sub-electrode CC extends so as to connect the connection portions for connecting the third main electrode CA and the fourth main electrode CB and extending in parallel to the first sub-electrode PC in the belt shape in the illustrated example. The second sub-electrode CC is arranged linearly extending along the first direction X. The second sub-electrode CC is arranged approximately in the center of the pixel PX, above the first sub-electrode PC.

The aperture regions which mainly contribute to the display in the pixel PX are formed between the first main electrodes PA1 to PA3 of the pixel electrode PE and the third main electrodes CA1 to CA4 of the counter electrode CE, and between the second main electrodes PB1 to PB3 of the pixel electrode PE and the fourth main electrodes CB1 to CB4 of the counter electrode CE. Where electric field is formed between the pixel electrode PE and the counter electrode CE, the main alignment directions of the liquid crystal molecule LM in each aperture are those shown with one of the arrows A1 to A4 in the figure. That is, four divided alignments are carried out in one pixel PX.

According to this embodiment, the generatrix L in each position in the first direction X that is the arrangement direction of the cylindrical lens 22a which is not illustrated intersects at least one of the pixel electrode PE and the counter electrode CE. When the distance between the pixel electrode PE and the counter electrode CE is set up like the illustrated example, and when the first extending direction D1 and the second extending direction D2 in which each main electrode of the pixel electrode PE and the counter electrode CE respectively extends are set up, both the pixel electrode PE and the counter electrode CE also intersect the generatrix L at any positions along in the first direction X.

Moreover, the generatrix L at any positions along with the first direction X also intersects the aperture formed between the pixel electrode PE and the counter electrode CE. The length of the line segment of the generatrix L in each position in the first direction X intersects the aperture formed between the pixel electrode PE and the counter electrode CE is approximately constant. The details of this point are mentioned later.

According to above structure, since the first sub-electrode PC is arranged on the gate line G1, the electric field from the gate line G1 is shield with the first sub-electrode PC. Accordingly, undesirable electric field impressed from the gate line G1 to the liquid crystal layer LQ is suppressed by the first sub-electrode PC, and consequently, it becomes possible to suppress a defected display, such as burn-in image and bright line image. Therefore, the high quality liquid crystal display device can be offered.

Moreover, since the first sub-electrode PC of the pixel electrode PE is arranged so as to overlap with the second sub-electrode CC of the counter electrode CE in parallel through the liquid crystal layer LQ, when potential difference is formed between the pixel electrode PE and the counter electrode CE, vertical electric field is formed therebetween. The vertical electric field divides the upper half portion and the bottom half portion of the pixel PX, and makes the liquid crystal molecules align approximately vertical direction with reference to the substrate.

It becomes possible to hold the state where the liquid crystal molecule alignment is made in the direction of the arrow A1 or the arrow A2 in the upper half portion of the pixel PX while being able to hold the state where the liquid crystal molecule alignment is made in the direction of the arrow A3 or the arrow A4 in the bottom half portion of the pixel PX by the vertical electric field. For this reason, it becomes possible to maintain equally each area rate of four domains where the alignment of the liquid crystal molecule differs in one pixel PX. Even if stress by pressing the liquid crystal display panel LPN is applied, generating of the disorder of alignment of the liquid crystal molecule in one pixel PX can be controlled, and it becomes possible to return to the original alignment state in an instant.

By the way, in this embodiment, the system which enables the display of the three-dimensional image as mentioned above corresponds to one of integral photography (hereinafter called IP) systems. The IP system does not need glasses etc., for exclusive use, but its flexibility of a viewpoint position is high and it makes possible to watch the three-dimensional images comfortably. In particular, the lens array unit 20 (lenticular sheet) which has the cylindrical lens array 22 is used as a light source controlling element, and light is controlled so that different pictures corresponding to the observed angles also can be seen even from the same position.

However, in the system using the cylindrical lens array 22, the light and darkness (called moire) of periodic luminosity occur in the arrangement direction of the cylindrical lens 22a by change of an aperture ratio in the generatrix direction of the cylindrical lens 22a, and it may become a cause of degrading display grace. This phenomenon is explained below.

Figure 9:
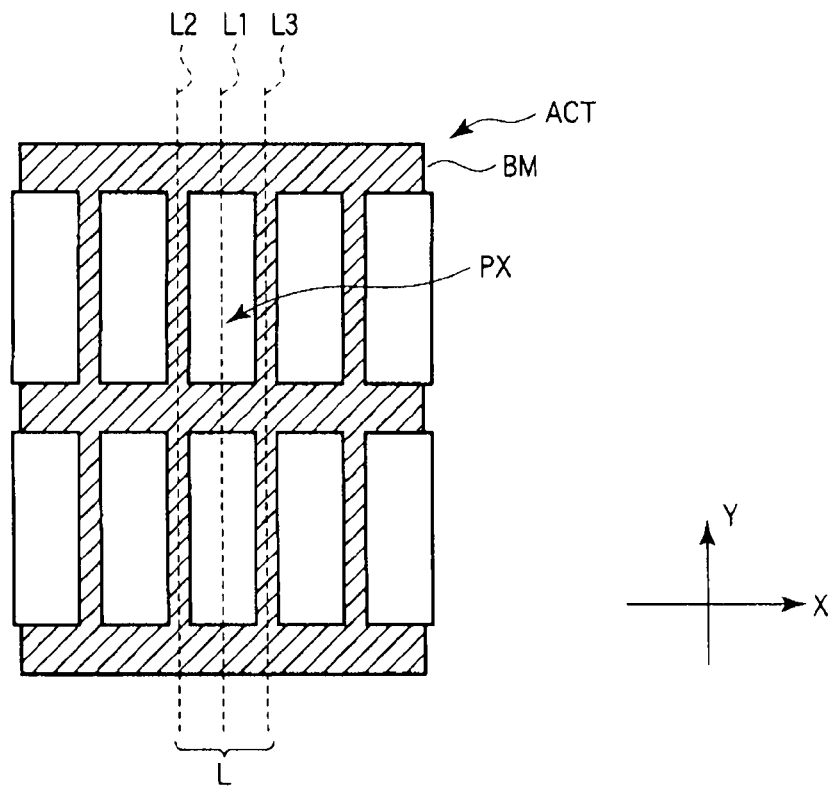
FIG. 9 is a figure showing a relation between a generatrix of a cylindrical lens and a pixel aperture ratio in case each pixel which constitutes an active area of the liquid crystal display panel is formed in a rectangular shape.

FIG. 9 is a figure showing the relation between the generatrix L of the cylindrical lens 22a and a pixel aperture ratio in case each pixel PX which constitutes the active area ACT of the liquid crystal display panel LPN is formed in a rectangular shape.

Each of the pixel PX has the shape of a rectangle whose length in the first direction X is shorter than that in the second direction Y. The black matrix BM is arranged between adjoining pixels PX. The black matrix BM is formed in the shape of a lattice extending in the first direction X and the second direction Y in the illustrated example, respectively.

In addition, irrespective of the existence of the black matrix BM, the various regions above the wiring regions such as the gate line, the source line, the auxiliary capacitance line, the switching element, etc., become dark areas which do not contribute to the display even if the liquid crystal molecules are aligned so that the whole active area ACT displays bright images. Moreover, the regions above the pixel electrode PE or above the counter electrode CE in each pixel PX may become the dark regions in which at least a portion does not contribute to the display as mentioned above.

Each of the cylindrical lenses 22a which are not shown extends along the second direction Y, and is arranged in a line along the first direction X. That is, the generatrix direction which the generatrix L of each cylindrical lens 22a extends is in parallel to the second direction Y.

Here, the relation of the generatrix L in each position in the first direction X that is the arrangement direction of the sylindrical lens and each domain of the active area ACT is reviewed. Here, one case is especially reviewed in which the liquid crystal molecules are aligned so as to display the bright images.

The generatrix L1 passing approximately the center of the pixel PX intersects the bright region of each pixel PX and the dark region of the black matrix BM. On the other hand, the whole of the generatrix L2 located in the left-hand side of generatrix L1 and the generatrix L3 located in the right-hand side of the generatrix L1 overlaps with the black matrix, and does not intersect the bright region. Thus, the generatrix L in each position in the first direction X may intersect the bright region or may overlap only with the dark region. That is, the pixel aperture ratio which contributes to the display changes with the positions in the first direction X.

Figure 10:
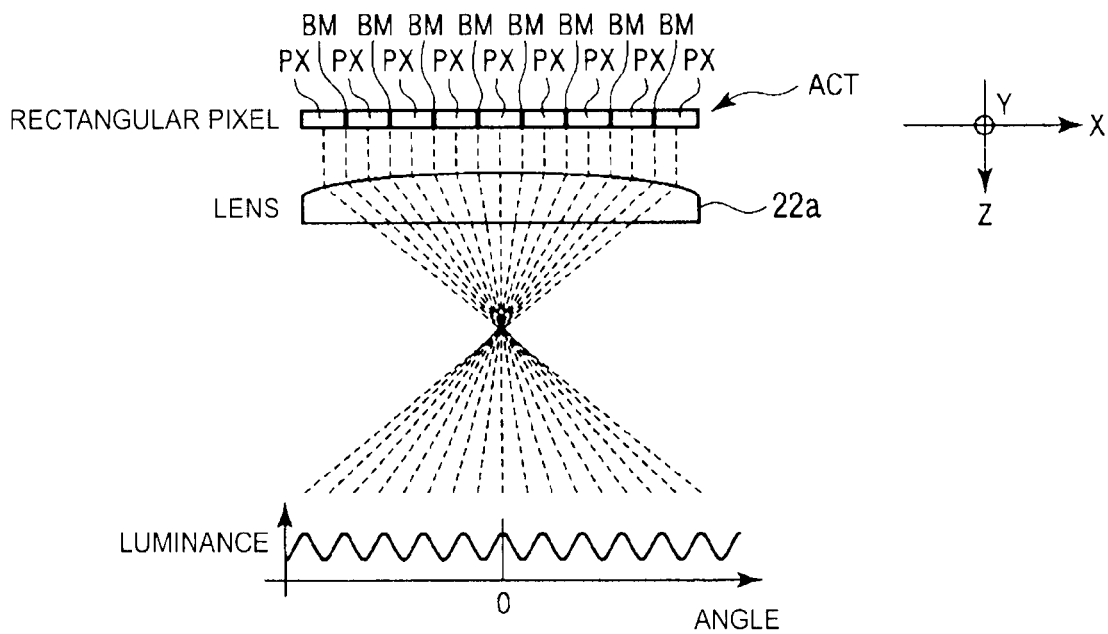
FIG. 10 is a figure showing a relation between the rectangular pixel corresponding to the example shown in FIG. 9 and luminance in each position in a direction in which cylindrical lens are arranged.

FIG. 10 is a figure showing the relation between the rectangular pixel corresponding to the example shown in FIG. 9 and the luminance in each position in the arrangement direction of the cylindrical lens 22a.

The cylindrical lens 22a faces with nine rectangular pixels PX and the black matrix BM arranged between adjacent rectangular pixels PX in a line along the first direction X. In the light pass which reaches to an observer's position through the cylindrical lens 22a from each pixel PX, the light from bright region of the pixel PX reaches to the observer's position. On the contrast, in the light pass which reaches to the observer's position through the cylindrical lens 22a from the black matrix BM, the light from the bright region of the pixel PX does not reach to the observer's position, and a low luminance is observed. Thus, the light and darkness of luminosity are observed with the angle at which the observer watches the cylindrical lens 22a.

Figure 11:
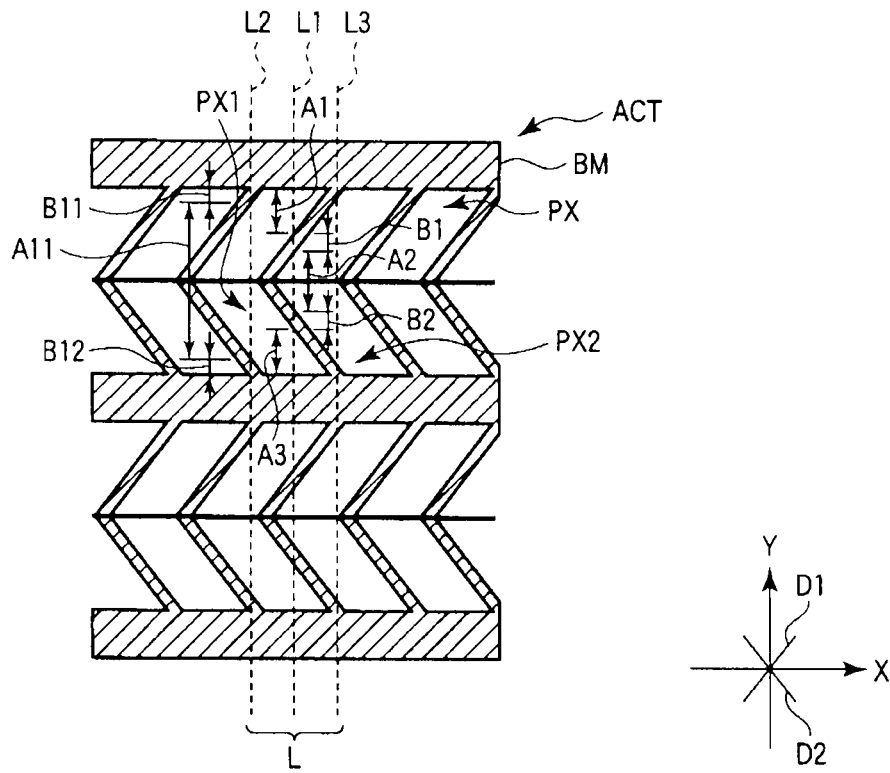
FIG. 11 is a figure showing the relation between the generatrix of the cylindrical lens and the aperture ratio of the pixel in a V character shape according to this embodiment.

FIG. 11 is a figure showing the relation of the generatrix L of the cylindrical lens 22a and the pixel aperture ratio of the pixel PX in a V character shape which constitutes the active area ACT of the liquid crystal display panel LPN according to this embodiment.

Each of the pixel PX extends in the first extending direction D1 and the second extending direction D2, and is formed in the shape of a V character or in the crooked shape. The black matrix BM is arranged between adjacent pixels PX. In the illustrated example, the black matrix BM is formed in a line along the first direction X, and in the shape of a V character or in the crooked shape between adjacent pixels PX in the first direction X.

In this embodiment of such structure, the relation between the generatrix L in each position and each domain of the active area ACT in the first direction X that is the arrangement direction of the cylindrical lens is reviewed. Here, the liquid crystal molecules are in the alignment state corresponding to bright display.

In the illustrated active area ACT, while the generatrix L1 which passes along both of a pixel PX1 and a pixel PX2 adjoining the right-hand side of the pixel PX1, intersects the bright regions of the pixel PX1 and the pixel PX2, the generatrix L1 crosses the dark regions such as the black matrix BM between the pixel PX1 and the pixel PX2. While the generatrix L2 which is located in the left-hand side of the generatrix L1, intersects the bright region of the pixel PX1, the generatrix L2 intersects the dark regions, such as the black matrix BM. While the generatrix L3 which is located in the right-hand side of the generatrix L1 intersects the bright region of the pixel PX2, the generatrix L3 intersects the dark region of the black matrix BM.

Thus, the generatrix L in each position in the first direction X certainly intersects at least one or more bright regions. In other words, regarding even other generatrixs L, the generatrixs L positioned in the first direction X do not overlap with only the dark region. In this embodiment, the pixel aperture ratio which contributes to the display becomes constant irrelevant of the position of the generatrixs L in the first direction X.

For example, the length of the line segment which intersects the bright region in the generatrix L1 is (A1+A2+A3), and the length of the line segment which intersects a dark region is (B1+B2). Therefore, the rate between the length of the both line segment is ((A1+A2+A3)/(B1+B2)). The length of the line segment which intersects the bright region in the generatrix L2 is (A11), and the length of the line segment which intersects the dark region is (B11+B12). Therefore, the rate between the length of the both line segment is ((A11)/(B11+B12)).

In this embodiment, the length (A1+A2+A3) of the line segment in which the generatrix L1 intersects the bright region is approximately the same as that of the length A11 of the line segment in which the generatrix L2 intersects the bright region. Furthermore, the length (B1+B2) of the line segment in which the generatrix L1 intersects the dark region is approximately the same as the length (B11+B12) of the line segment in which the generatrix L2 intersects the dark region. That is, the generatrix crosses both the bright region and the dark region in any positions along the first direction X. The length of the line segment which intersects the bright region is approximately the same irrespective the position of the generatrix L, and the length of the line segment which intersects the dark region is also approximately the same in each generatrix L. Moreover, a rate between the length of the line segment which intersects the bright region and the length of the line segment which intersects the dark region is approximately the same as for any positions of the generatrix L in the first direction X.

In addition, although illustration is omitted here, since the bright region is substantially formed in the aperture between the pixel electrode PE and the counter electrode CE, the length of the line segment which intersects the aperture in the generatrix L at each position is almost constant irrespective of the position in the first direction X.

Figure 12:
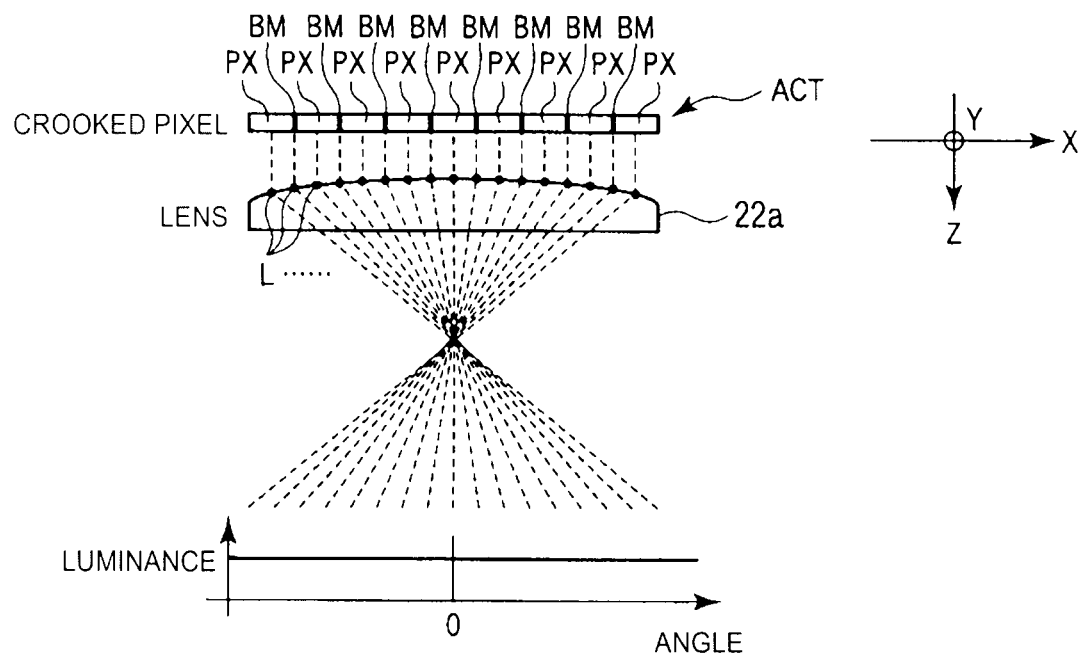
FIG. 12 is a figure showing the relation between the V shape pixel (crooked pixel) according to this embodiment shown in FIG. 11 and luminance at each position in the direction in which the cylindrical lens are arranged.

FIG. 12 is a figure showing the relation between the V character shape pixel (crooked pixel) shown in FIG. 11 according to this embodiment, and the luminance in each position in the arrangement direction of the cylindrical lens 22a.

The cylindrical lens 22a faces nine crooked pixels PX located in a line along the first direction X and the black matrix BM arranged between adjacent pixels PX. In this case, the generatrix L in each position of the cylindrical lens 22a does not counter with only the black matrix BM. Moreover, the length of the line segment in which the generatrix L in each position in the first direction X intersects the bright region is approximately the same as above-mentioned.

For this reason, the images are observed with luminosity irrespective of the angle at which the observer watches the cylindrical lens 22a. That is, it becomes possible to control generating of the brightness and the darkness (moire) of periodic luminosity in the arrangement direction of the cylindrical lens 22a, and it becomes possible to control the degradation of display grace.

Moreover, according to this embodiment, the liquid crystal molecule LM is switched using horizontal electric field or oblique electric field between the pixel electrode PE formed in array substrate AR and the counter electrode CE formed in the counter substrate CT, it becomes possible to control generating of bright lines due to reverse tilt as compared with the TN mode.

In this embodiment, a following display inspection is made. A display unit 10 is equipped with the liquid crystal display panel LPN in which the pixel pitch between the adjoining pixels PX which constitute the active area ACT is 5 μm×168 μm. The lens pitch of the cylindrical lens 22a of the lens array unit 20 is 504 μm. When the same potential corresponding to the bright display is applied between the pixel electrode PE and the counter electrode CE of all the pixels PX in the active area ACT, the display inspection was conducted. As a consequence, it was checked that the bright lines were not generated, and uniform display grace was obtained. Moreover, when the luminance in the active area ACT was measured, the brightness and the darkness of periodic luminosity were not formed along the first direction X, that is, it was checked that moire did not occur.

As explained above, according to this embodiment, the high quality liquid crystal display device can be offered.

While certain embodiments have been described, these embodiments have been presented by way of example only, and are not intended to limit the scope of the inventions. In practice, the structural and method elements can be modified without departing from the spirit of the invention. Various embodiments can be made by properly combining the structural and method elements disclosed in the embodiments. For example, some structural and method elements may be omitted from all the structural and method elements disclosed in the embodiments. Furthermore, the structural and method elements in different embodiments may properly be combined. The accompanying claims and their equivalents are intended to cover such forms or modifications as would fall with the scope of the inventions.

What is claimed is:

1. A liquid crystal display device having a plurality of pixels, comprising:
   a lens array unit including a cylindrical lens array constituted by a plurality of cylindrical lenses each having a lens surface and a generatrix corresponding to the lens surface, the lens surface being arranged in a line in a direction orthogonally crossing the generatrix;
   a first substrate arranged at a back side of the lens array unit and including a pixel electrode in a belt shape extending in a different direction from the direction in which the generatrix extends, the pixel electrode being formed in a V character shape extending in first and second extending directions different from the generatrix in each pixel;
   a second substrate arranged between the lens array unit and the first substrate including a counter electrode in a belt shape commonly arranged above the pixel electrode and extending in a parallel direction to the pixel electrode, the counter electrode being formed in a V character shape extending in the first and second extending directions in each pixel; and
   a liquid crystal layer containing liquid crystal molecules and held between the first substrate and the second substrate;
   wherein the generatrix of the cylindrical lens at each position of the arrangement direction of the cylindrical lens crosses the pixel electrode and the counter electrode in the character V shape respectively extending in the first and second extending directions, and a line segment in which the generatrix crosses an aperture formed between the pixel electrode and the counter electrode is constant in each position, and
   wherein the generatrix at each position of the arrangement direction of the cylindrical lens crosses a bright region and a dark region, and a length of a line segment in which the generatrix crosses the bright region is approximately equal at each position of the arrangement direction of the cylindrical lens when the liquid crystal molecules are aligned in a state corresponding to a bright display.

2. The liquid crystal display device according to claim 1, wherein the pixel electrode includes a first main electrode in a belt shape extending in the first extending direction, and a second main electrode in a belt shape extending in the second extending direction and connected with the first main electrode.

3. The liquid crystal display device according to claim 2, wherein the first substrate includes a gate line, and the pixel electrode further includes a first sub-electrode in a belt shape arranged on the gate line and extending along a parallel direction with the gate line from a connecting portion of the first main electrode with the second main electrode.

4. The liquid crystal display device according to claim 3, wherein the counter electrode includes a third main electrode in a belt shape extending in the first extending direction and a fourth main electrode in a belt shape extending in the second extending direction and connected with the third main electrode.

5. The liquid crystal display device according to claim 4, wherein the counter electrode further includes a second sub-electrode in a belt shape extending in a parallel direction with the first sub-electrode from a connecting portion of the third main electrode and the fourth main electrode, and arranged above the first sub-electrode.

6. The liquid crystal display device according to claim 1, wherein
the liquid crystal molecules are initially aligned in a generatrix direction or an arrangement direction of the cylindrical lenses in a state where an electric field is not formed between the pixel electrode and the counter electrode.

7. The liquid crystal display device according to claim 1, wherein the liquid crystal display device displays three-dimensional images.

8. The liquid crystal display device according to claim 1, wherein the lens array unit is formed of a lenticular lens.

9. The liquid crystal display device according to claim 1, wherein one pixel is divided into a plurality of domains each having approximately same aperture rate.

10. The liquid crystal display device according to claim 1, wherein a black matrix layer is formed between adjacent pixels to define respective apertures.

11. A liquid crystal display device a having a plurality of pixels, comprising:
a lens array unit including a cylindrical lens array constituted by a plurality of cylindrical lenses each having a lens surface and a generatrix corresponding to the lens surface, the lens surface being arranged in a line in a direction orthogonally crossing the generatrix;
a first substrate arranged at a back side of the lens array unit and including a pixel electrode in a belt shape extending in a different direction from the direction in which the generatrix extends, the pixel electrode being formed in a V character shape in each pixel extending in first and second extending directions different from the generatrix in each pixel;
a second substrate arranged between the lens array unit and the first substrate including a counter electrode in a belt shape commonly arranged above the pixel electrode extending in a parallel direction to the pixel electrode, the counter electrode being formed in a V character shape extending in the first and second extending directions in each pixel; and
a liquid crystal layer containing liquid crystal molecules and held between the first substrate and the second substrate;
wherein the generatrix of the cylindrical lens at each position of the arrangement direction of the cylindrical lens crosses the pixel electrode and the counter electrode in the character V shape respectively extending in the first and second extending directions and a line segment in which the generatrix crosses an aperture formed between the pixel electrode and the counter electrode is constant in each position,
wherein the generatrix at each position of the arrangement direction of the cylindrical lens crosses a bright region and a dark region, and a length of a line segment in which the generatrix crosses the bright region is approximately equal at each position of the arrangement direction of the cylindrical lens when the liquid crystal molecules are aligned in a state corresponding to a bright display,
wherein the pixel electrode includes a first main electrode in a belt shape extending in the first extending direction and a second main electrode in a belt shape extending in the second extending direction and connected with the first main electrode, and
wherein the counter electrode includes a third main electrode in a belt shape extending in the first extending direction and a fourth main electrode in a belt shape extending in the second extending direction and connected with the third main electrode.

12. The liquid crystal display device according to claim 11, wherein the first substrate further includes a gate line, and the pixel electrode further includes a first sub-electrode arranged on the gate line and extending in a belt shape extending in a parallel direction with the gate line from a connecting portion of the first main electrode with the second main electrode, and
wherein the counter electrode further includes a second sub-electrode extending in a belt shape in a parallel direction with the first sub-electrode from a connecting portion of the third main electrode and a fourth main electrode, and arranged above the first sub-electrode.

13. The liquid crystal display device according to claim 11, wherein the liquid crystal display device displays three-dimensional images.

14. The liquid crystal display device according to claim 11, wherein the lens array unit is formed of a lenticular lens.

15. The liquid crystal display device according to claim 11, wherein one pixel is divided into a plurality of domains each having approximately same aperture rate.

16. The liquid crystal display device according to claim 11, wherein a black matrix layer is formed between the adjacent pixels to define respective apertures.

* * * * *